United States Patent [19]
Bruns et al.

[11] Patent Number: 5,845,802
[45] Date of Patent: Dec. 8, 1998

[54] GREASE CARTRIDGE CARRIER

[76] Inventors: Steven A. Bruns, Rte. 1, Box 96, Hector, Minn. 55342; Mark W. Bruns, 380 Connecticut St., Hutchinson, Minn. 55350

[21] Appl. No.: 874,534

[22] Filed: Jun. 13, 1997

[51] Int. Cl.[6] ................................................. B65D 41/06
[52] U.S. Cl. ........................... 220/293; 206/384; 206/446
[58] Field of Search ........................ 220/293, 296, 220/297, 298, 300, 301, 903, DIG. 13, 671, 675, 4.27; 215/329, 43, 44, 330, 332; 206/384, 443, 446, 822

[56] References Cited

U.S. PATENT DOCUMENTS

| | | |
|---|---|---|
| D. 308,025 | 5/1990 | Gregory . |
| 1,674,542 | 6/1928 | Clawson . |
| 1,832,669 | 11/1931 | Thomas .................................... 215/332 |
| 2,506,204 | 5/1950 | Freestone . |
| 3,071,282 | 1/1963 | Walters ................................ 220/293 X |
| 3,312,336 | 4/1967 | Fally . |
| 3,501,063 | 3/1970 | Sundholm . |
| 4,006,837 | 2/1977 | Gates et al. ......................... 220/293 X |
| 4,185,756 | 1/1980 | Sciamonte . |
| 4,257,526 | 3/1981 | Weits et al. ............................. 215/332 |
| 4,387,821 | 6/1983 | Geiger .................................... 215/332 |
| 4,482,073 | 11/1984 | Gagliardi ................................ 215/332 |
| 4,856,652 | 8/1989 | Bowland . |
| 4,913,263 | 4/1990 | Spiers . |
| 4,955,480 | 9/1990 | Sexton ................................ 206/446 X |
| 5,072,850 | 12/1991 | Gagnon et al. ..................... 215/332 X |
| 5,160,021 | 11/1992 | Sibley et al. ........................ 215/332 X |
| 5,466,020 | 11/1995 | Page et al. .......................... 215/332 X |

FOREIGN PATENT DOCUMENTS

| | | | |
|---|---|---|---|
| 2567104 | 1/1986 | France .................................... 215/329 |
| 4001609 | 7/1991 | Germany ................................. 220/293 |

*Primary Examiner*—Stephen K. Cronin
*Assistant Examiner*—Nathan Newhouse
*Attorney, Agent, or Firm*—Burd, Bartz & Gutenkauf

[57] ABSTRACT

A carrier for a grease cartridge has a body with an internal chamber for accommodating a grease cartridge and non-cylindrical outside longitudinal surfaces. A cap having non-cylindrical outside longitudinal surfaces aligned with the outside surfaces of the body is releasable connected to the body to close the chamber.

28 Claims, 5 Drawing Sheets

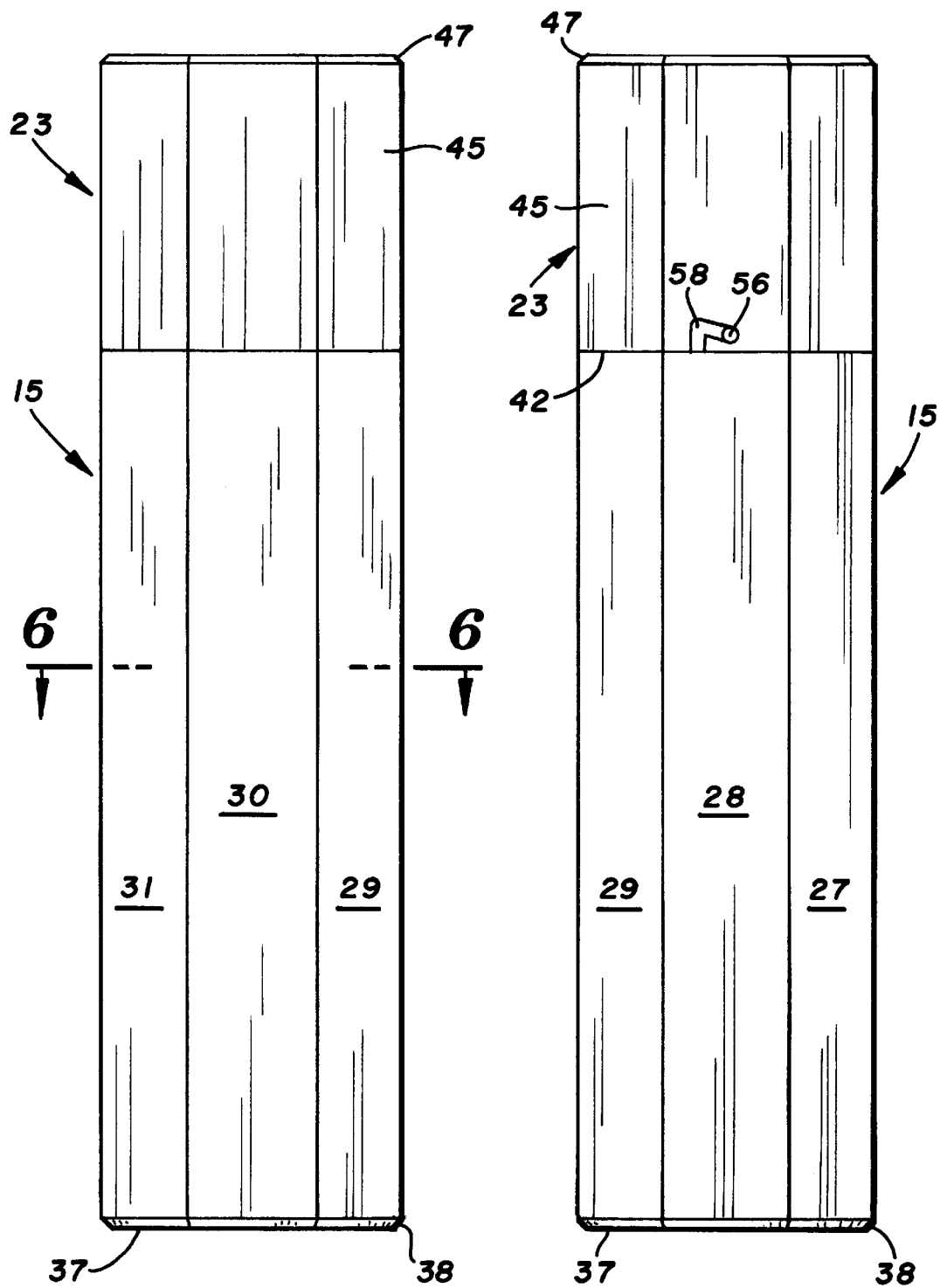

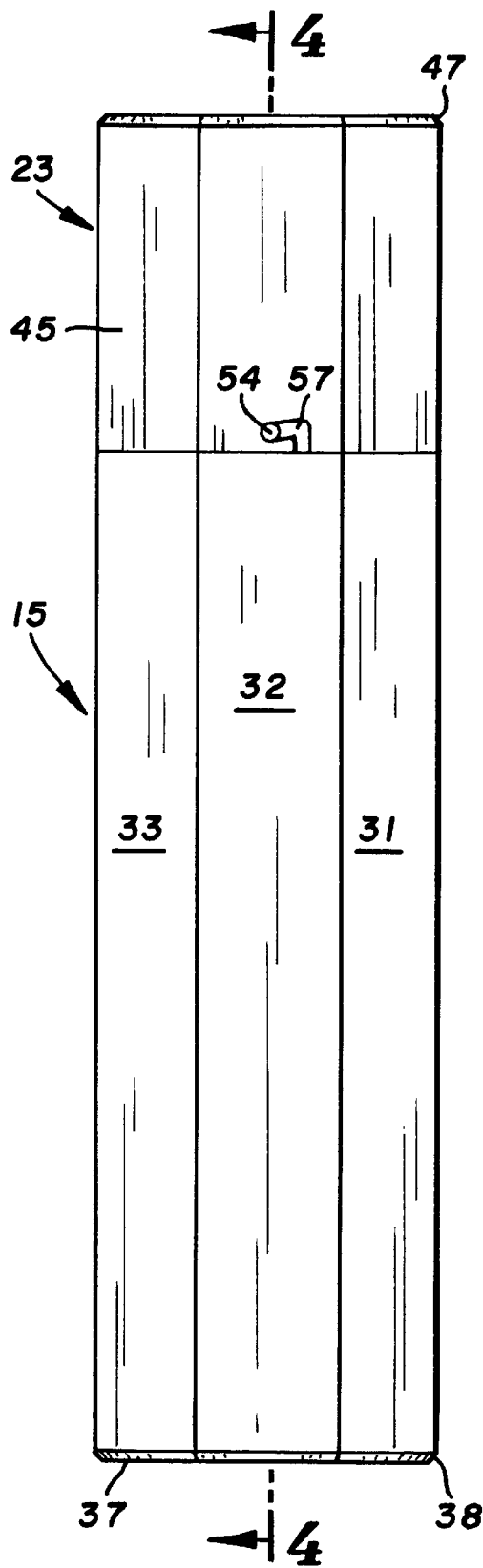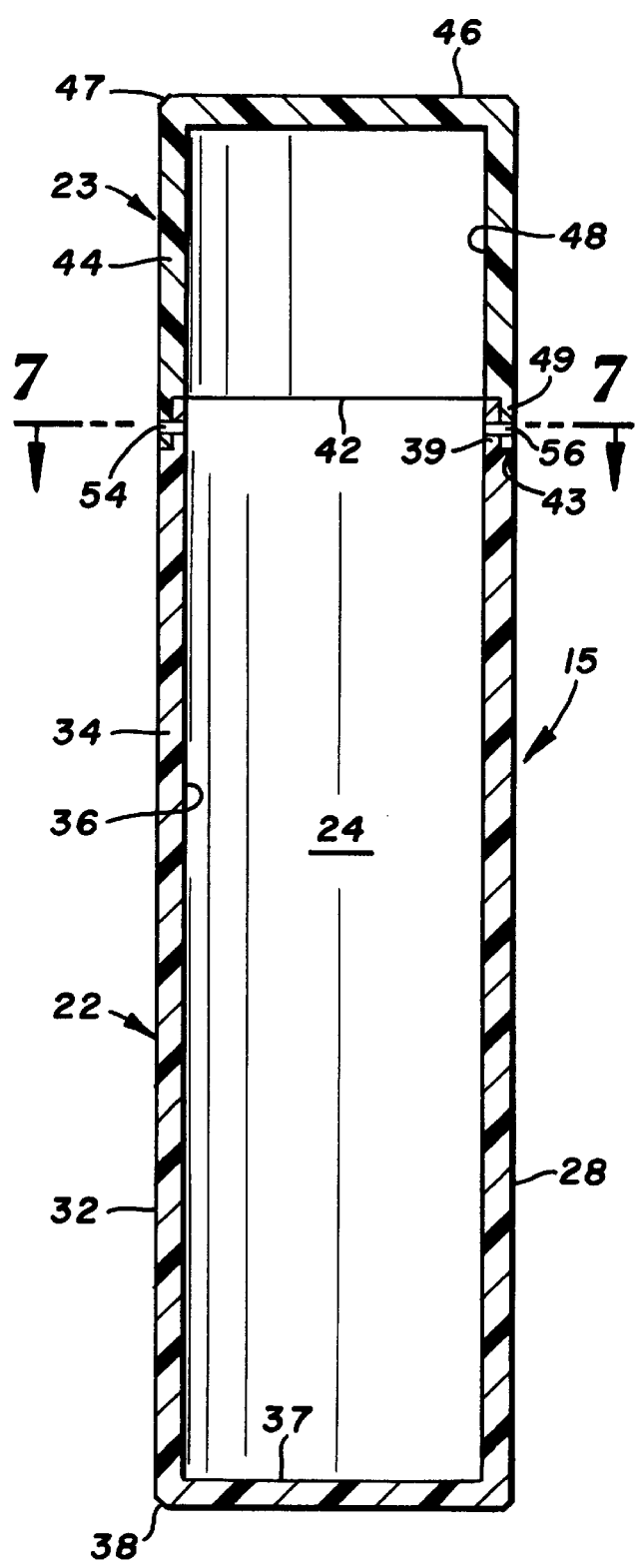

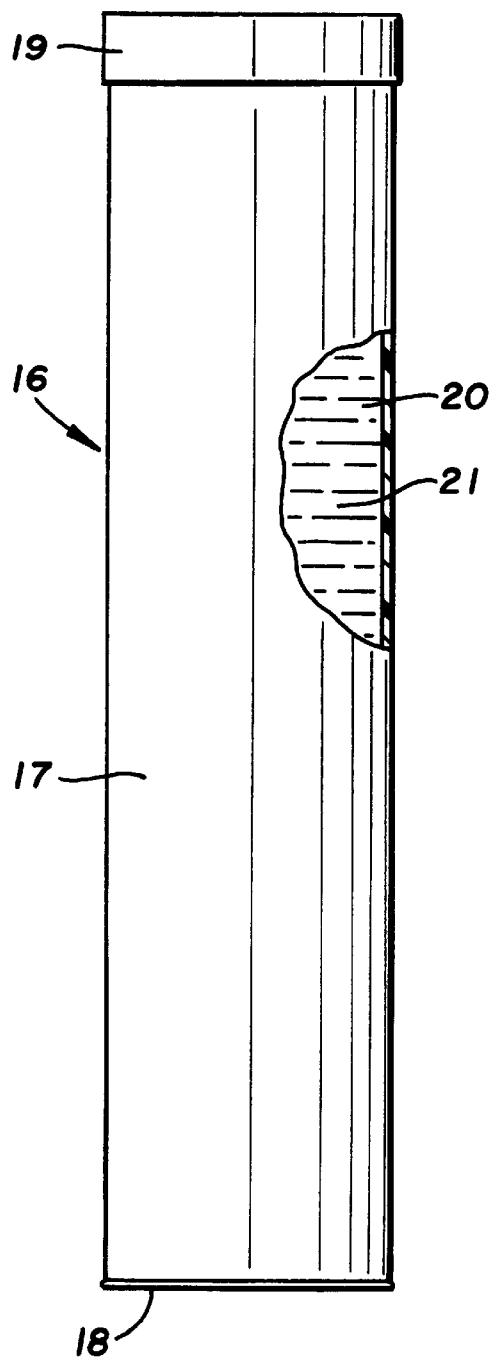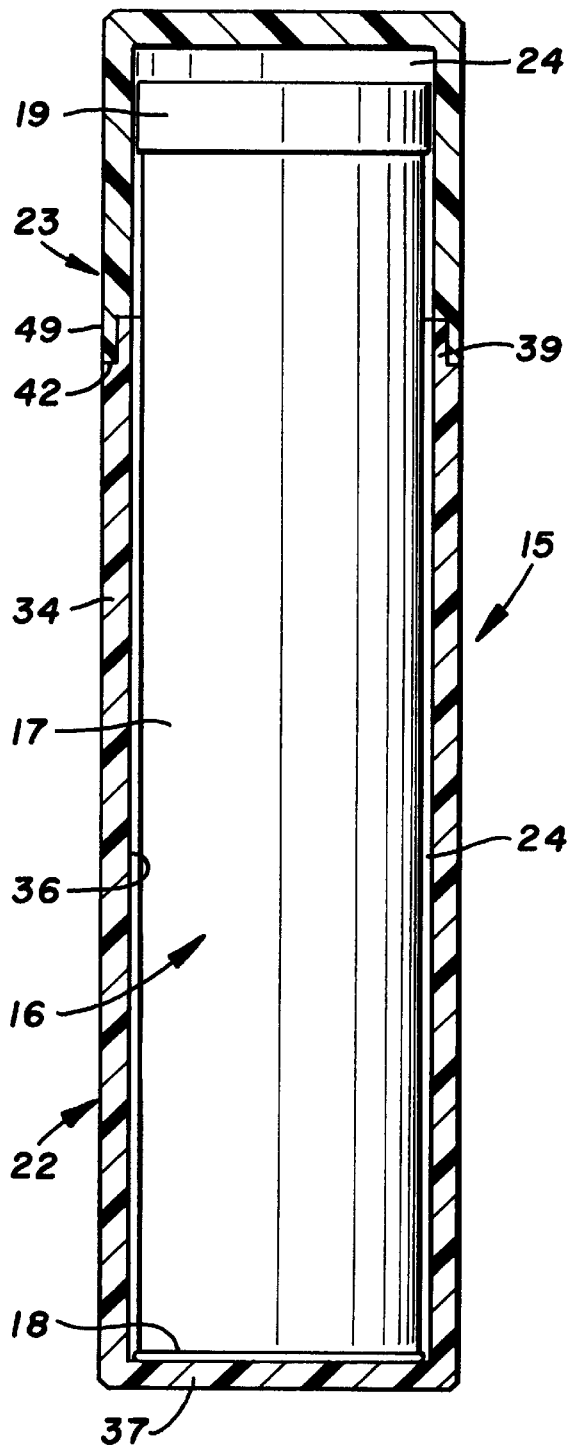
*FIG.10*  *FIG.11*

GREASE CARTRIDGE CARRIER

FIELD OF THE INVENTION

The invention is in the field of packaging containers accommodating cartridges storing grease, oil and other flowable products.

BACKGROUND OF THE INVENTION

Grease and lubricants are stored in cylindrical cartridges used with grease guns which dispense grease to selected locations. The cartridges are marketed as individual products and in groups. B. J. Gregory in U.S. Pat. No. Des. 308,025 shows a design of a grease cartridge package having a box with an open front. Four grease cartridges are contained within the box. The removal of one grease cartridge from the box allows the remaining cartridges to fall out of the box into dirt, dust and other contaminants.

Tractor trailer vehicles have fifth wheel attachments coupling the tractor to the trailer. The facing surfaces of the fifth wheel attachments must be lubricated to reduce wear and friction. Grease guns carried in the tractor are used to spread grease on the facing surfaces of the fifth wheel attachments. D. D. Spiers in U.S. Pat. No. 4,913,263 discloses the use of grease guns for lubricating fifth wheel attachments coupling tractors to trailers and an envelope of grease placed between the plates of the fifth wheel attachment. The walls of the envelope rupture between the plates allowing the grease to spread between the plates. Additional grease cartridges or envelopes of grease are stored in the tractor of in a tool box. The cartridges being cylindrical can rock and roll in storage compartments. Caps on the cartridges can dislodge causing grease to spill and contaminate the grease with dust, dirt and other foreign materials. The walls of the cartridges can also be cut thereby allowing grease to escape into the storage compartment.

SUMMARY OF THE INVENTION

The invention is a grease cartridge carrier that holds a grease cartridge in a protected chamber which prevents puncture of the cartridge and keeps dust and dirt out of the grease. The carrier has a non cylindrical shape which minimizes rocking and rolling on a surface or in a storage compartment. The carrier is conveniently stackable in a storage location.

The preferred embodiment of the carrier has body having a cylindrical chamber for accommodating a conventional grease cartridge. A cap locked onto the body retains the grease cartridge in the chamber. The body has a plurality of elongated generally flat and rectangular outer surfaces. In one form of the carrier the outer surfaces have an octagonal pattern with each surface having substantially the same area. The cap has a side wall with outside surfaces that are coextensive with the outer surfaces of the body. The cap is releasably attached to the body with cooperating pins and angle slots on adjacent portions of the body and cap.

DESCRIPTION OF THE DRAWINGS

FIG. 1 is a front elevational view of the grease cartridge carrier of the invention., the rear elevational view is a mirror image of FIG. 1;

FIG. 2 is a side elevational view of the right side thereof;

FIG. 3 is a side elevational view of the left side thereof;

FIG. 4 is a sectional view taken along line 4—4 of FIG. 3;

FIG. 10 is a side elevational view of a grease cartridge;

FIG. 11 is a longitudinal sectional view similar to FIG. 4 of the carrier accommodating a grease cartridge.

DETAIL DESCRIPTION OF PREFERRED EMBODIMENT OF THE INVENTION

Figure 5:
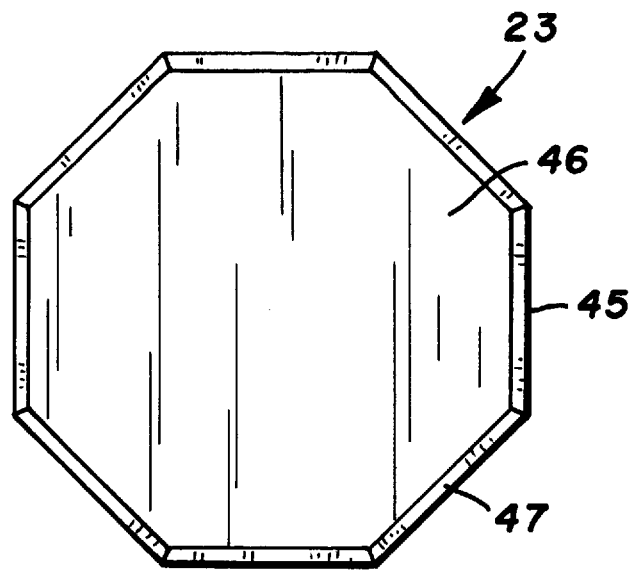
FIG. 5 is a top plan view thereof.

The grease cartridge carrier 15, shown in FIGS. 1 to 4, is a durable and lightweight container for storing a conventional grease cartridge 16. As shown in FIG. 10, cartridge 16 has a cylindrical, plastic side wall 17 joined to a bottom member 18. A cup-shaped cap 19 closes the top of wall 17. Cartridge 16 has a cylindrical chamber filled with a semi-solid lubricant 22, known as red grease. Example of a grease cartridge for a grease fun is disclosed by A. Clawson in U.S. Pat. No. 1,674,542 and J. B. Freestone in U.S. Pat. No. 2,506,204. Cartridge 16 is used with a grease gun to lubricate truck and trailer parts and machines that require lubrication. In use one or more cartridges are stored in tool chests and storage areas of a truck. The cylindrical shape of cartridge 16 permits it to rock and roll in storage areas. Cap 19 can be dislodged causing grease to escape into the storage area. Carrier 15 encloses cartridge 16 to prevent damage tot he cartridge and retain cap 19 of side wall 17 so as to eliminate contamination of the grease and escape of grease from the cartridge.

Figure 6:
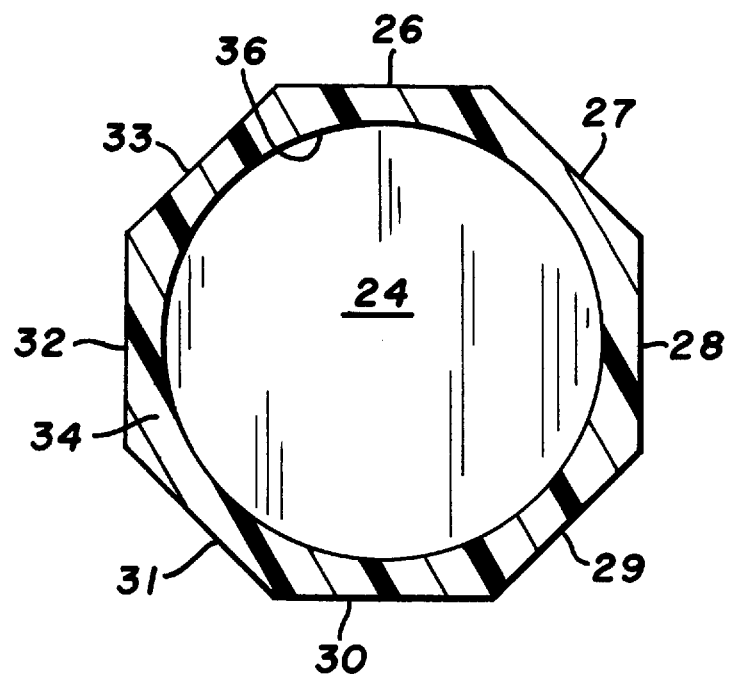
FIG. 6 is a sectional view taken along line 6—6 of FIG. 1.

Returning to FIGS. 1 to 4, carrier 15 has a body 22 and cap 23 surrounding a closed internal chamber 24 for accommodating grease cartridge 16. Body 22 has a plurality of elongated generally flat and rectangular outer surfaces 26, 27, 28, 29, 30, 31, 32 and 33. Surfaces 26–33 have substantially the same areas and are arranged in an octagonal pattern as shown in FIG. 6. The outer surfaces of body can have other non-cylindrical shapes including three, four, five and six sides. Surfaces 26–33 when positioned on a support minimize rolling and movement of the body relative to the support. Surfaces 26–33 are on the outside of a side wall 34 of the carrier. Wall 34 has an inside cylindrical surface 36 around chamber 24.

Figure 7:
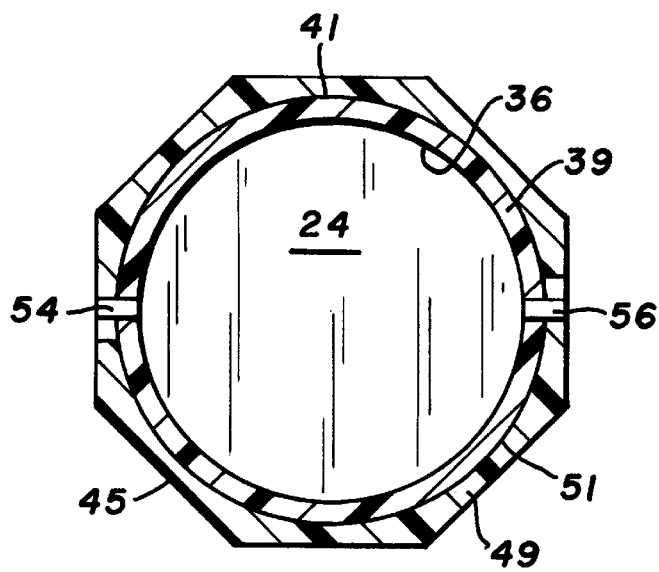
FIG. 7 is a sectional view taken along line 7—7 of FIG. 4.
Figure 9:
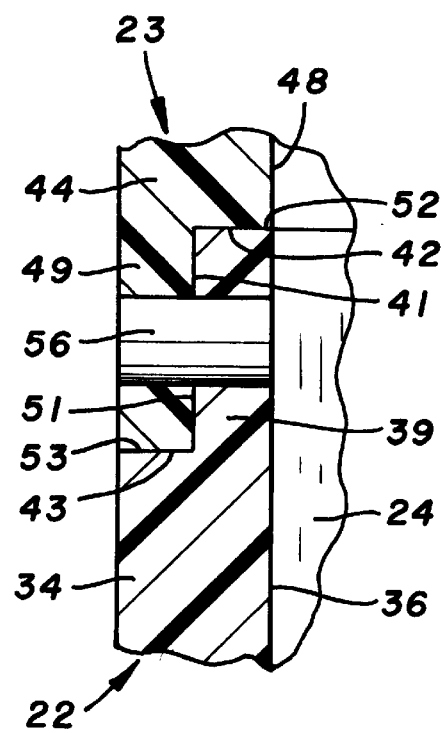
FIG. 9 is a sectional view taken along line 9—9 of FIG. 8.

Side wall 34 is joined to a bottom wall 37 closing the lower end of the chamber 24. Bevel edges 38 are at the lower ends of surfaces 26–33 and outer periphery of bottom wall 37. As shown in FIGS. 4, 7 and 9, upper end of side wall 34 has a rim or cylindrical flange 39 with an outer cylindrical surface 41 and a circular top edge 42. Flange 39 has a width about one half of the width of side wall 34. An annular shoulder 43 on side wall 34 surrounds flange 39. Side wall 34, bottom wall 37 and flange 39 are a one-piece structure of rigid material, such as plastic, metal or composite materials.

Cap 23 has a side wall 44 with eight outside surfaces 45, a flat top wall 46 and a beveled edge 47 surrounding top wall 46 at the upper ends of outside surfaces 45. Surface 45 each have a rectangular shape with a width the same as the surfaces 26–33 on body 34. The inside of side wall 44 has a cylindrical inside surface 48 corresponding to surface 36 of body 34. The bottom of side wall 44 has a downwardly directed lip 49 with an inside cylindrical surface 51, an upper edge 52 and lower edge 53, shown in FIG. 9. Lip 49 has a width of about one half the width of side wall 44 and telescopes over flange 39.

Figure 8:
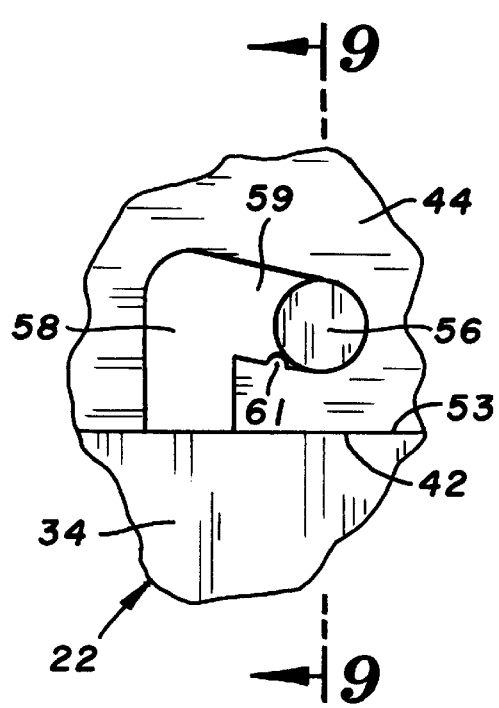
FIG. 8 is an enlarged side view of the releasable lock securing the cap to the body of the grease cartridge carrier.

Cap 23 is locked on body 22 with a pair of pins 54 and 56 secured to flange 39 projected inwardly into slot 57 and 58 inside wall lip 49 of cap 23. As shown in FIG. 8, each slot 57 and 58 has a upward longitudinal inlet open to lower edge 53 and a downwardly inclined circumferential blind section 59. A detent 61 on wall 44 projects into slot section 59 to lock cap 23 on body 22. As shown in FIGS. 1 to 3, the flat outside faces of cap 23 are in registration with the surfaces 26 to 33 of body 22. The aligned flat surfaces of body 22 and cap 23 minimizes rolling of carrier 15 in a storage space.

In use grease cartridge 16 is inserted into chamber 24 with the cap end extended through the open end of body 22. Cap 23 is placed over the end 19 of cartridge 16. The inlets of the slots 57 and 58 are aligned with pins 54 and 56 to allow cap 23 to be telescoped over annular flange 39 of body 22. Cap 23 is then turned in a clockwise direction to move pins 54 and 56 into slot sections 59 past detentes 61. The detentes 61 hold pins 54 and 56 in the blind ends of slots sections 59. The downwardly inclined top edges of the slot sections 59 engage pins 54 and 56 to force cap 23 tight against shoulder 42 so as to prevent dust, dirt and particulate matter from flowing into chamber 24. Cap 23 is removed from body 22 by turning cap 23 counterclockwise relative to body 22 to align pins 54 and 56 with slat sections 58. Cap 23 is then pulled from body 22. Grease cartridge 16 can be withdrawn from chamber 24 by gripping the upper end of the cartridge that extends out of body 22.

While there has been shown and described an embodiment of the grease cartridge carrier, it is understood that changes in materials, size, and parts maybe made by a person skilled in the ar without departing from the invention. The invention is defined in the following claims.

We claim:

1. A carrier for a cylindrical grease cartridge comprising: a body having a side wall, a bottom wall, and an open upper end, said side wall having an internal cylindrical surface surrounding a chamber for accommodating a lower portion of the grease cartridge and a plurality of non-cylindrical longitudinal outside surfaces extended the length of the side wall, a cap having a side wall, a top wall and an open lower end, said cap side wall having an inside cylindrical surface surrounding a space for accommodating the upper portion of the grease cartridge and a plurality of non-cylindrical longitudinal outside surfaces aligned with the outside surfaces of the body, and means for releasably connecting the cap to the body with the open upper end of the body in communication with the open lower end of the cap.

2. The carrier of claim 1 wherein: the plurality of non-cylindrical longitudinal outside surfaces on the side wall of the body comprise eight generally flat and rectangular surfaces.

3. The carrier of claim 2 wherein: each of the rectangular surfaces have substantially the same area.

4. The carrier of claim 2 wherein: the plurality of non-cylindrical longitudinal outside surfaces on the side wall of the cap comprise eight generally flat and rectangular surfaces.

5. The carrier of claim 4 wherein: each of the rectangular surfaces of the cap have substantially the same area.

6. The carrier of claim 1 wherein: the side wall of the body has an upright top flange having an outer cylindrical surface, and the side wall of the cap has a downwardly extended lip having an inside cylindrical surface, said lip extending over said flange when the cap is mounted on the body, said inside and outside cylindrical surfaces being located in surface engagement to inhibit entrance of foreign matter into the chamber.

7. The carrier of claim 6 wherein: said means for releasably connecting the cap to the body comprises pin means and angled slot means accommodating the pin means on the flange and lip to hold the cap on the body.

8. The carrier of claim 7 wherein: the slot means includes a plurality of slots, each slot having a longitudinal section and an inclined blind circumferential section and the pin means includes a pin projected into each slot.

9. The carrier of claim 8 including: detent means extended into each circumferential section of a slot to releasably retain the pin in the circumferential section of the slot.

10. The carrier of claim 1 wherein: the internal cylindrical surface of the side wall of the body and the inside cylindrical surface of the side wall of the cap have substantially the same diameters.

11. A carrier for a cartridge storing flowable material, said cartridge having upper and lower portions comprising: a body having a side wall, a bottom wall, and an open upper end, said side wall having an internal surface surrounding a chamber for accommodating a lower portion of the cartridge and a plurality of non-cylindrical longitudinal outside surfaces extended the length of the side wall, a cap having a side wall, a top wall and an open lower end, said cap side wall having an inside surface surrounding a space open to the lower end for accommodating an upper portion of the cartridge and a plurality of non-cylindrical longitudinal outside surfaces equal in member to the outside surface of the body, said outside surfaces of the cap being aligned with the outside surfaces of the body when the cap is attached to the body, and means for releasably connecting the cap to the body to close the open upper end of the body and the lower end of the cap.

12. The carrier of claim 11 wherein: the plurality of non-cylindrical longitudinal outside surfaces on the side wall of the body comprise eight generally flat and rectangular surfaces.

13. The carrier of claim 12 wherein: each of the rectangular surfaces have substantially the same area.

14. The carrier of claim 13 wherein: the plurality of non-cylindrical longitudinal outside surfaces on the side wall of the cap comprise eight generally flat and rectangular surfaces.

15. The carrier of claim 14 wherein: each of the rectangular surfaces of the cap have substantially the same area.

16. The carrier of claim 11 wherein: the side wall of the body has an upright top flange having an outer cylindrical surface, and the side wall of the cap has a downwardly extended lip having an inside cylindrical surface, said lip extending over said flange when the cap is mounted on the body, said inside and outside cylindrical surfaces being located in surface engagement to inhibit entrance of foreign matter into the chamber.

17. The carrier of claim 16 wherein: said means for releasably connecting the cap to the body comprises pin means and angled slot means accommodating the pin means on the flange and lip to hold the cap on the body.

18. The carrier of claim 17 wherein: the slot means includes a plurality of slots, each slot having a longitudinal section and an inclined blind circumferential section and the pin means includes a pin projected into each slot.

19. The carrier of claim 18 including: detent means extended into each circumferential section of a slot to releasably retain the pin in the circumferential section of the slot.

20. The carrier of claim 11 wherein: the internal surfaces of the body and cap are cylindrical surfaces having substantially the same diameters.

21. A carrier for a cylindrical grease cartridge comprising: a body having a side wall, a bottom wall, and an open upper end, said side wall having an internal cylindrical surface surrounding a chamber for accommodating a lower portion of the grease cartridge, a plurality of non-cylindrical longitudinal outside surfaces extended the length of the side wall, and an upright top flange having an outer cylindrical surface, each of said plurality of non-cylindrical longitudinal outside surfaces on the side wall of the body being generally flat, a cap having a side wall, a top wall and an open lower end, said cap side wall having an inside cylindrical surface surrounding a space for accommodating the upper portion of the grease cartridge and a plurality of non-cylindrical longitudinal generally flat outside surfaces aligned with and corresponding in number to the outside surfaces of the body, said cap including a downwardly extended lip having an inside cylindrical surface, said lip extending over said flange when the cap is mounted on the body, said inside and outside cylindrical surfaces being located in surface engagement to inhibit entrance of foreign matter into the chamber, and means for releaseably connecting the cap to the body with the open upper end of the body in communication with the open lower end of the cap and retaining the flat outside surfaces of the body and cap aligned with each other.

22. The carrier of claim 21 wherein: said means for releasably connecting the cap to the body comprises pin means and angled slot means accommodating the pin means on the flange and lip to hold the cap on the body.

23. The carrier of claim 22 wherein: the slot means includes a plurality of slots, each slot having a longitudinal section and an inclined blind circumferential section and the pin means includes a pin projected into each slot.

24. The carrier of claim 23 including: detent means extended into each circumferential section of a slot to releasably retain the pin in the circumferential section of the slot.

25. The carrier of claim 21 wherein: each of said plurality of non-cylindrical outside surfaces of the body have substantially the same area.

26. The carrier of claim 21 wherein: each of said plurality of non-cylindrical outside surfaces of the cap have substantially the same area.

27. The carrier of claim 21 wherein: each of said plurality of non-cylindrical outside surfaces of the body have substantially the same area, and each of said plurality of non-cylindrical outside surfaces of the cap have substantially the same area.

28. The carrier of claim 21 wherein: the internal cylindrical surface of the side wall of the body and the inside cylindrical surface of the side wall of the cap have substantially the same diameters.

\* \* \* \* \*